United States Patent
Ramsden et al.

(10) Patent No.: US 10,351,716 B2
(45) Date of Patent: Jul. 16, 2019

(54) ANTIFOULING COATING COMPOSITION COMPRISING AT LEAST TWO SALT-CONTAINING COPOLYMERS

(71) Applicant: Akzo Nobel Coatings International B.V., Arnhem (NL)

(72) Inventors: Richard Mark Ramsden, Gateshead (GB); Clayton Price, Whitley Bay (GB); John Fox, North Shields (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/322,621

(22) PCT Filed: Jul. 10, 2015

(86) PCT No.: PCT/EP2015/065887
§ 371 (c)(1),
(2) Date: Dec. 28, 2016

(87) PCT Pub. No.: WO2016/008824
PCT Pub. Date: Jan. 21, 2016

(65) Prior Publication Data
US 2017/0130065 A1  May 11, 2017

(30) Foreign Application Priority Data
Jul. 15, 2014 (EP) .................................. 14177067

(51) Int. Cl.
*C09D 5/16* (2006.01)
*C09D 133/14* (2006.01)
*C08F 220/18* (2006.01)
*C09D 133/26* (2006.01)

(52) U.S. Cl.
CPC .......... *C09D 5/1668* (2013.01); *C08F 220/18* (2013.01); *C09D 133/14* (2013.01); *C09D 133/26* (2013.01)

(58) Field of Classification Search
CPC ... C08F 222/02; C09D 133/02; C09D 133/14; C09D 5/16; C08L 33/14; C08L 2205/025
See application file for complete search history.

(56) References Cited

U.S. PATENT DOCUMENTS 5,597,858 A * 1/1997 Ramesh .................... C08F 2/28
524/458
7,001,933 B2 * 2/2006 Lines ...................... C08F 20/34
523/122

FOREIGN PATENT DOCUMENTS

| CA | 2384427 A1 | 3/2001 |
| CA | 2802277 A1 | 12/2011 |
| GB | 2273934 B * | 7/1994 |
| JP | 60210677 A * | 10/1985 |
| JP | 02064167 A * | 3/1990 |
| JP | 2003509546 A | 3/2003 |
| JP | 2013534551 A | 9/2013 |
| WO | 04/018533 A1 | 3/2004 |
| WO | 10/018144 A1 | 2/2010 |

OTHER PUBLICATIONS

Machine translated English language equivalent of JP 02-064167 (1990, 6 pages).*
Machine translated English language equivalent of JP 60-210677 (1985, 5 pages).*
CAPlus Abstract of JP 60-210677 (AN 1986:150911, 1986, 2 pages).*
Human translation of JP 60-210677 (1985, 20 pages).*
Human translation of JP 02-064167 (1990, 27 pages).*

* cited by examiner

*Primary Examiner* — Brieann R Johnston
(74) *Attorney, Agent, or Firm* — McDonnell Boehnen Hulbert & Berghoff LLP

(57) ABSTRACT

The present invention relates to an antifouling coating composition comprising an ingredient having marine biocidal properties, and at least two different copolymers comprising salt groups. The antifouling coating composition has excellent antifouling properties. The present invention also relates to a method of providing a substrate with antifouling performance in an aqueous environment, and the use of the antifouling coating composition for protection of man-made structures immersed in water.

11 Claims, No Drawings

ANTIFOULING COATING COMPOSITION COMPRISING AT LEAST TWO SALT-CONTAINING COPOLYMERS

This application is a US national phase of International Application No. PCT/EP2015/065887, filed Jul. 10, 2015, which claims priority to European Application No. 14177067.7, filed Jul. 15, 2014.

This invention relates to anti-fouling paint, especially for marine applications.

Man-made structures such as boat hulls, buoys, drilling platforms, oil production rigs, and pipes which are immersed in water are prone to fouling by aquatic organisms such as green and brown algae, barnacles, mussels, and the like. Such structures are commonly made of metal, but may also comprise other structural materials such as concrete. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

It is known to use anti-fouling paint, for instance as a top coat on ships' hulls, to inhibit the settlement and growth of marine organisms such as barnacles and algae, generally by release of a biocide for the marine organisms.

Traditionally, anti-fouling paints have comprised a relatively inert binder with a biocidal pigment that is leached from the paint. Among the binders which have been used are vinyl resins and rosin. Vinyl resins are seawater-insoluble and paints based on them use a high pigment concentration so as to have contact between the pigment particles to ensure leaching. Rosin is a hard brittle resin that is very slightly soluble in seawater. Rosin-based anti-fouling paints have been referred to as soluble matrix or eroding paints. The biocidal pigment is very gradually leached out of the matrix of rosin binder in use, leaving a skeletal matrix of rosin, which becomes washed off the hull surface to allow leaching of the biocidal pigment from deep within the paint film.

Many successful anti-fouling paints in recent years have been "self-polishing copolymer" paints based on a polymeric binder to which biocidal tri-organotin moieties are chemically bound and from which the biocidal moieties are gradually hydrolysed by seawater. In such binder systems, the side groups of a linear polymer unit are split off in a first step by reaction with seawater, the polymer framework that remains becoming water-soluble or water-dispersible as a result. In a second step, the water-soluble or water-dispersible framework at the surface of the paint layer on the ship is washed out or eroded. Such paint systems are described for example in GB-A-1 457 590. As the use of tri-organotin has been restricted by legislation and has become prohibited world-wide, there is a need for alternative anti-fouling substances that can be used in anti-fouling compositions.

Self-polishing copolymer paints, which release non-biocidal moieties, are described in EP-A-69 559, EP-A-204 456, EP-A-529 693, EP-A-779 304, WO-A-91/14743, WO-A-91/09915, GB-A-231 070, and JP-A-9-286933.

Self-polishing paints for anti-fouling end use comprising polymers comprising non-metal salt groups pendant to the polymer back bone are known in the prior art.

GB-A-2 273 934 describes hydrolysable polymeric binders comprising quaternary ammonium groups bound to a polymeric backbone. Such a polymeric binder is prepared by co-polymerisation of halide-capped quaternary ammonium monomers of which one of the R groups has a (meth) acrylamide functionality. These polymeric binders are partially soluble in seawater due to the halide-capped quaternary ammonium groups.

WO-A-02/02698 describes an anti-fouling paint which is gradually dissolved in seawater. The paint comprises a binder and an ingredient having marine biocide properties. The binder comprises a rosin material and an auxiliary film-forming resin. The auxiliary film-forming resin comprises a non-hydrolysing, water-insoluble film-forming polymer and an acid-functional film-forming polymer the acid groups of which are blocked by quaternary ammonium groups or quaternary phosphonium groups. In a first step, the blocking groups are hydrolysed, dissociated or exchanged with seawater species, the polymer framework that remains becoming soluble or dispersible in seawater as a result. In a second step, the soluble or dispersible framework at the surface of the paint layer on the ship is washed out or eroded.

WO 2004/018533 describes an antifouling coating composition comprising an ingredient having marine biocidal properties and a polymer comprising quaternary ammonium groups and/or quaternary phosphonium groups bound to the backbone of the polymer, said quaternary ammonium groups and/or quaternary phosphonium groups being neutralised by counter-ions, wherein the counter-ions consist of the anionic residue of an acid having an aliphatic, aromatic, or alkaryl hydrocarbon group comprising 6 or more carbon atoms.

There is a need for further antifouling paints having low toxicity and improved antifouling performance.

Surprisingly, the antifouling coating composition of the present invention comprising at least two copolymers having non-metal salt groups has superior antifouling performance over known antifouling paints of the prior art.

Specifically, the antifouling coating composition of the present invention comprises
 (a) an ingredient having marine biocidal properties,
 (b) a first copolymer comprising pendant to the polymer backbone, side chains A1, side chains B1 and optionally side chains C1, and
 (c) a second copolymer comprising pendant to the polymer backbone, side chains A2, side chains C2, and optionally side chains B2,
wherein
side chains A1 and A2 may be same or different and comprise a non-metal salt group;
side chains B1 and B2 may be same or different and have the structure —$(Y)_n$—$R^3$;
side chains C1 and C2 may be same or different and have the structure —$(Y)_n$—$R^4$;
Y is —C(O)—O—, —C(O)—N($R^6$)—, or —O—;
n is 0 or 1;
$R^6$ is H, a monovalent hydrocarbon group, or a bond to $R^3$ or $R^4$;
$R^3$ is a hydrocarbon group, optionally substituted with one or more heteroatoms selected from O, N, S, or a halogen group, wherein the total sum of carbon atoms in $R^3$ and $R^6$ in each of side chains B1 and B2 is 5 or more; and
$R^4$ is a hydrocarbon group, optionally substituted with one or more heteroatoms selected from O, N, S, or a halogen group wherein the total sum of carbon atoms in $R^4$ and $R^6$ in each of side chains C1 and C2 ranges from 1 to 4;
and wherein
the molar ratio of $$\frac{\text{side chain } B1}{\text{side chain } B1 + \text{side chain } C1}$$

in the first copolymer>the molar ratio of $$\frac{\text{side chain } B2}{\text{side chain } B2 + \text{side chain } C2}$$

in the second copolymer

The hydrocarbon group of $R^3$ may, for example, be a linear, branched or cyclic alkyl or aryl group, optionally substituted with one or more heteroatoms selected from O, N, S, or a halogen group, wherein the total sum of carbon atoms in $R^3$ and $R^6$ in each of side chains B1 and B2 is 5 or more.

The hydrocarbon group of $R^4$ may, for example, be a linear, branched or cyclic alkyl group, optionally substituted with one or more heteroatoms selected from O, N, S, or a halogen group wherein the total sum of carbon atoms in $R^4$ and $R^6$ in each of side chains C1 and C2 ranges from 1 to 4.

Preferably, $R^3$ is a linear, branched or cyclic alkyl or aryl group, optionally substituted with one or more heteroatoms selected from O, N, S, or a halogen group, wherein the total sum of carbon atoms in $R^3$ and $R^6$ in each of side chains B1 and B2 ranges between 5 and 40, preferably between 5 and 25.

$R^3$ and $R^6$ in side chains B1 and B2 should be selected so that total sum of carbon atoms in $R^3$ and $R^6$ is 5 or more. Preferably the total sum of carbon atoms in $R^3$ and $R^6$ is between 5 and 40, most preferably between 5 and 25.

Examples of $R^3$ includes methyl, ethyl, propyl, n-propyl, i-propyl, t-butyl, n-butyl, iso-butyl, sec-butyl, neo-pentyl, neo-pentyl, hexyl, cyclohexyl, heptyl, octyl iso-decyl acrylate, iso-decyl, n-decyl, 2-ethylhexyl acrylate, stearyl, isobornyl, t-Amyl, N-(n-octadecyl), n-dodecyl, hexadecyl, tert-butylcyclohexyl, tri methylcyclohexyl, dimethylcyclohexyl, benzhydryl, benzyl, chlorophenyl, chlorophenyl, 2-naphthyl, 2-phenoxyethyl, phenyl, 2-phenylethyl, chlorophenyl, tert-octyl and butoxyethyl. $R^6$ may be, for example H, a monovalent alkyl group such as a methyl, ethyl, propyl, n-propyl, i-propyl or hexyl, heptyl, octyl group, an aryl group such as a phenyl group, or a bond to $R^3$. Suitably $R^6$ in side chains B1 and B2 is H, a $C_1$-$C_6$ alkyl or phenyl group.

Preferably, $R^4$ is a linear branched or cyclic alkyl group, optionally substituted with one or more heteroatoms selected from O, N, S, or a halogen group, wherein the total sum of carbon atoms in $R^4$ and $R^6$ in each of side chains C1 and C2 ranges from 1 to 4.

$R^4$ and $R^6$ in side chains C1 or in side chains C2 should be selected so that total sum of carbon atoms in $R^4$ and $R^6$ ranges from 1 to 4.

Examples of $R^4$ includes methyl, ethyl, propyl, n-propyl, i-propyl, t-butyl, n-butyl, iso-butyl, sec-butyl groups. These groups may be substituted with one or more heteroatoms selected from O, N, S, or a halogen group. Other examples of $R^4$ therefore includes monovalent methoxymethyl, ethoxymethyl, propoxymethyl, methoxyethyl, ethoxyethyl, methoxypropyl, methylol, ethylol, propylol and butylol groups.

$R^6$ may be, for example H, monovalent methyl, ethyl, propyl, n-propyl, i-propyl groups or a bond to R4.

If $R^6$ is a bond to $R^4$, then $R^6$ and $R^4$ together would form a cyclic alkyl group containing a nitrogen. The cyclic group may be optionally substituted with one or more heteroatoms selected from O, N, S, or a halogen group. For example, if $R^4$ is —$CH_2$—$CH_2$—O—$CH_2$—$CH_2$— and $R^6$ is a bond, then the result is a morpholine group at the end of the side chain. If R4 is —$CH_2$—$CH_2$—N—$CH_2$—$CH_2$— and $R^6$ is a bond, then the result is a piperazine group at the end of the side chain. If $R^4$ is —$CH_2$—$CH_2$—$CH_2$—C(O)— and $R^6$ is a bond, then the result is a pyrrolidone group at the end of the side chain.

Suitably $R^6$ in side chains C1 and C2 is a H, or a methyl or ethyl group.

Preferably the non-metal salt groups on side chains A1 and A2 comprise a cation selected from quaternary ammonium groups or quaternary phosphonium groups, and an anion selected from an anionic residue of an acid counter-ion having an aliphatic, aromatic, or alkaryl hydrocarbon group, or a halide anion.

Examples of halide anions are chlorine, iodine and bromine anions.

Preferably, the anion of the non-metal salt group is an anionic residue of an acid counter-ion having an aliphatic, aromatic, or alkaryl hydrocarbon group.

For example, the non-metal salt groups on side chains A1 and A2 may be acid groups bound to the side chain of the polymer, the acid groups being neutralized by quaternary ammonium groups or quaternary phosphonium groups. Polymers containing such salt groups are described in WO 2002/02698.

Alternatively, the salt groups on side chains A1 and A2 may be quaternary ammonium groups or quaternary phosphonium groups bound to the side chain of the polymer, the quaternary groups being neutralised by an anionic residue of an acid counter-ion having an aliphatic, aromatic, or alkaryl hydrocarbon group. Polymers containing such salt groups, including method of how to prepare them are described in WO 2004/018533.

Suitably, the side chains A1 and A2 have the structure:
—$(Y)_n$—$R^1$—$Z^{(+)}$ $R^{2(-)}$ wherein Y is —C(O)—O—, —C(O)—NH—, —O—;
n is 0 or 1;
$R^1$ is a divalent alkylene having 2 or 3 to 12 carbon atoms,
Z is a quaternary ammonium group or quaternary phosphonium group and $R^2$ is an anionic residue of an acid counter having an aliphatic, aromatic, or alkaryl hydrocarbon group. The aliphatic, aromatic, or alkaryl hydrocarbon group comprising 6 or more carbon atoms, may have for example 6 to 50 carbon atoms.

The anionic residue of an acid counter having an aliphatic, aromatic, or alkaryl hydrocarbon group may, for example, be the residue of a carboxylic acid, sulfonic acid, sulfinic acid, phosphonic acid or phosphinic acid. Preferably, the anionic residue of a sulphonic acid or a carboxylic acid is used.

The first copolymer and the second copolymer may be poly(meth)acrylate and/or poly(meth)acrylamide copolymers. In these cases, Y would be —C(O)—O— or —C(O)—NH—, and n would be 1. Even though the first and second copolymers may be poly(meth)acrylates and/or poly(meth)acrylamides, it is understood that it is the structure of the side chains pendent to the copolymers and not the back bone of the polymer itself that determines the efficacy of the antifouling paint comprising said polymers.

In a preferred composition, the molar ratio of $$\frac{\text{side chains } B1}{\text{side chains } B1 + \text{side chains } C1}$$

(in me first copolymer) is greater than or equal to 0.50, and the molar ratio of $$\frac{\text{side chains } B2}{\text{side chains } B2 + \text{side chains } C2}$$

(in the second copolymer) is less than 0.50. For example, the molar ratio of $$\frac{\text{side chains } B1}{\text{side chains } B1 + \text{side chains } C1}$$

may be greater than or equal to 0.60, and the molar ratio of $$\frac{\text{side chains } B2}{\text{side chains } B2 + \text{side chains } C2}$$

may be less than 0.40.

For the avoidance of doubt, for any given copolymer having side chains B and side chains C, the molar ratio of $$\frac{\text{side chains } B}{\text{side chains } B + \text{side chains } C}$$

means the average number of pendant side chains B per molecule of the copolymer divided by the sum of the average number of pendant side chains B plus the average number of pendant side chains C per molecule of the copolymer. B1 and C1 relate to side chains on the first copolymer of the present invention, and B2 and B2 relate to side chains on the second copolymer.

For example, where a copolymer is obtained by the polymerization of unsaturated monomers of general formula $CH_2=C(R^5)B$ and $CH_2=C(R^5)C$, where $R^5$ is H or $CH_3$, each monomer unit that is incorporated into a copolymer will provide one pendant side chain B or one pendant side chain C. Where a copolymer is obtained by the polymerization of unsaturated monomers of general formula BCH$(R^5)=C(R^5)B$ and $C(CH(R^5)=C(R^5)C$, where $R^5$ is H or $CH_3$, each monomer unit that is incorporated into a copolymer will provide two pendant side chains B or two pendant side chain C.

In such cases, the average number of pendant side chains B and C per molecule of the copolymer directly reflects the molar ratio of the different monomers used to prepare the copolymer. Each monomer unit that is incorporated into a copolymer may therefore provide one or two pendant side chains B, or one or two pendant side chains C. The molar ratio $$\frac{\text{side chains } B}{\text{side chains } B + \text{side chains } C}$$

can therefore be calculated by knowing the amount of each monomer used to prepare the copolymer, and the number of pendant side chains that are provided by each monomer unit that is incorporated into the copolymer.

In a preferred composition, the mol % of side chains A1:mol % of side chains B1: mol % of side chains C1 in the first copolymer is 5-50: 50-95:0-45, and the mol % of side chains A2:mol % of side chains B2:mol % of side chains C2 in the second copolymer is 5-50: 0-45:50-95, wherein mol % in the first copolymer is based on the total sum of side chains A1+B1+C1 and mol % in the second copolymer in based on the total sum of side chains A2+B2+C2.

Usually at least 80 mol % of the monomers making up the first copolymer has a side chain A1, B1 or C1. Usually at least 80 mol % of the monomers making up the second copolymer has a side chain A2, B2 or C2. The first and second polymers may therefore also be made from up to 20 mol % of monomers not having a side chain A1/A2, B1/B2 or C1/C2. Monomers not having side chains A1/A2, B1/B2 or C1/C2 include for example, ethylene, vinyl chloride and vinyl alcohol.

Typically however all of the monomers making up the first copolymer have a side chain A1, B1 or C1, and all of the monomers making up the second copolymer have a side chain A2, B2 or C2.

The first copolymer and the second copolymer are typically prepared from unsaturated monomers, such as acrylate monomers.

The first copolymer is obtainable by reacting at least monomers of Formula (I), monomers of Formula (II) and optionally monomers of Formula (III); and the second copolymer (which is different from the first copolymer) is obtainable by reacting at least monomers of Formula (I), monomers of Formula (III) and optionally monomers of Formula (II), wherein the monomer of Formula (I) has the structure $CH_2=C(R^5)-Y-R^1Z^{(+)}R^{2(-)}$;

the monomer of Formula (II) has the structure $CH_2=C(R^5)-Y-R^3$;

the monomers of Formula (III) has the structure $CH_2=C(R^5)-Y-R^4$; wherein $R^5$ is H or $CH_3$;

Z is a quaternary ammonium group or quaternary phosphonium group;

Y is $-C(O)-O-$, $-C(O)-NH-$, $-O-$;

$R^1$ is a divalent alkylene having 2 or 3 to 12 carbon atoms;

$R^2$ is an anionic residue of an acid counter having an aliphatic, aromatic, or alkaryl hydrocarbon group;

$R^3$ is a hydrocarbon group, optionally substituted with one or more heteroatoms selected from O, N, S, or a halogen group, wherein the total sum of carbon atoms in $R^3$ and $R^5$ in the same monomer is 5 or more; and $R^4$ is a hydrocarbon group, optionally substituted with one or more heteroatoms selected from O, N, S, or a halogen group, wherein the total sum of carbon atoms in $R^4$ and $R^5$ in the same monomer ranges from 1 to 4.

The first copolymer and the second copolymer are different.

The substituents, Z, Y, $R^1$, $R^2$, $R^3$ and $R^4$, are further defined herein.

For example, the first copolymer may be prepared from (is obtainable from) at least the following: 5-50 mol % of monomers of Formula (I), 45-95 mol % of monomers of Formula (II) and 0-55 mol % of monomers of Formula (III); and the second copolymer may be prepared from (is obtainable from) at least the following: 5-50 mol % of monomers of Formula (I), 0-55 mol % of monomers of Formula (II) and 45-95 mol % of monomers of Formula (III), wherein the monomer of Formula (I) has the structure $CH_2=C(R^5)-Y-R^1Z^{(+)}R^{2(-)}$;

the monomer of Formula (II) has the structure $CH_2=C(R^5)-Y-R^3$;

the monomers of Formula (III) has the structure $CH_2=C(R^5)-Y-R^4$;

$R^5$ is H or $CH_3$, and Z, Y, $R^1$, $R^2$, $R^3$ and $R^4$ are as defined above; and wherein mol % is calculated in the total sum (quantity) of monomers of Formula (I), Formula (II) and Formula (III) used to prepare each polymer.

Examples of monomers having the structure of Formula (I) include the following: 3-(methacrylamidopropyl) trimethylammonium, 3-(acrylamidopropyl) trimethylammonium, 3-(methacrylamidoethyl) trimethylammonium, 3-(acrylamidoethyl) trimethylammonium, 3-(methacrylatopropyl) trimethylammonium, 3-(acrylatopropyl) trimethylammonium, 3-(methacrylatoethyl) trimethylammonium, 3-(acrylatoethyl) trimethylammonium, 3-(methacrylamidopropyl) methyldiethylammonium, 3-(acrylamidopropyl) methyldiethylammonium, 3-(methacrylamidoethyl) methyldiethylammonium, 3-(acrylamidoethyl) methyldiethylammonium, 3-(methacrylatopropyl) methyldiethylammonium, 3-(acrylatopropyl) methyldiethylammonium, 3-(methacrylatoethyl) methyldiethylammonium, 3-(acrylatoethyl) methyldiethylammonium, 3-(methacrylamidopropyl) benzyldimethylammonium, 3-(acrylamidopropyl) benzyldimethylammonium, 3-(methacrylamidoethyl) benzyldimethylammonium, 3-(acrylamidoethyl) benzyldimethylammonium, 3-(methacrylatopropyl) benzyldimethylammonium, 3-(acrylatopropyl) benzyldimethylammonium, 3-(methacrylatoethyl) benzyldimethylammonium, 3-(acrylatoethyl) benzyldimethylammonium, 3-(methacrylamidopropyl) trimethylphosphonium, 3-(acrylamidopropyl) trimethylphosphonium, 3-(methacrylamidoethyl) trimethylphosphonium, 3-(acrylamidoethyl) trimethylphosphonium, 3-(methacrylatopropyl) trimethylphosphonium, 3-(acrylatopropyl) trimethylphosphonium, 3-(methacrylatoethyl) trimethylphosphonium, 3-(acrylatoethyl) trimethylphosphonium, 3-(methacrylamidopropyl) methyldiethylphosphonium, 3-(acrylamidopropyl) methyldiethylphosphonium, 3-(methacrylamidoethyl) methyldiethylphosphonium, 3-(acrylamidoethyl) methyldiethylphosphonium, 3-(methacrylatopropyl) methyldiethylphosphonium, 3-(acrylatopropyl) methyldiethylphosphonium, 3-(methacrylatoethyl) methyldiethylphosphonium, 3-(acrylatoethyl) methyldiethylphosphonium, 3-(methacrylamidopropyl) benzyldimethylphosphonium, 3-(acrylamidopropyl) benzyldimethylphosphonium, 3-(methacrylamidoethyl) benzyldimethylphosphonium, 3-(acrylamidoethyl) benzyldimethylphosphonium, 3-(methacrylatopropyl) benzyldimethylphosphonium, 3-(acrylatopropyl) benzyldimethylphosphonium, 3-(methacrylatoethyl) benzyldimethylphosphonium, 3-(acrylatoethyl) benzyldimethylphosphonium, salts with camphorsulphonate, benzenesulphonate, p-toluenesulphonate, cyclohexanesulphonate, octanesulphonate, butanesulphonate, ethanesulphonate, methanesulphonate, dodecylbenzenesulphonate, dodecanesulphonate, mesitylenesulphonate, 2,4,6-triisopropylbenzenesulphonate, and beta-naphthylsulphonate, palmitate, stearate, laurate, ethylhexanoate, or rosinate, abietate, dehydroabietate, dihydroabietate or tetrahydroabietate counterions.

Preferred monomers having the structure of Formula (I) are (meth)acrylamidoalkyl trialkylammonium or (meth)acrylatoalkyl trialkylammonium salts with optionally substituted aliphatic or aromatic sulphonate or carboxylate counterions, more preferably (meth)acrylamidoalkyl trialkylammonium or (meth)acrylatoalkyl trialkylammonium salts with optionally substituted aliphatic or aromatic sulphonate counterions. Suitably the alkyl in the (meth)acrylamidoalkyl trialkylammonium or (meth)acrylatoalkyl trialkylammonium salts are C1-C10 alkyl groups, which may be the same or different. Suitably the optionally substituted aliphatic or aromatic sulphonate counterions have between 1 and 50 carbon atoms, for example between 1 and 25 carbon atoms or between 6 and 25 carbons. The aliphatic sulphonate/carboxylate counterions may be linear, branched or cyclic.

The use of the term "(meth)" is to be understood in its normal way to mean that the methyl group is optionally present.

Examples of monomers having the structure of Formula (II) include the following: neo-pentyl acrylate, neo-pentyl methacrylate, hexyl methacrylate, hexyl acrylate cyclohexyl acrylate cyclohexyl methacrylate, heptyl acrylate, heptyl methacrylate, octyl acrylate, octyl methacrylate, iso-decyl acrylate, iso-decylmethacrylate, n-decyl acrylate, n-decyl methacrylate, 2-ethylhexyl acrylate, 2-ethylhexyl methacrylate, stearyl acrylate, isobornyl acrylate, isobornyl methacrylate, t-Amyl acrylate, t-Amyl methacrylate, N-(n-Octadecyl) acrylamide, n-dodecyl acrylate n-dodecyl methacrylate, hexadecyl methacrylate, hexadecyl acrylate, tert-butylcyclohexyl methacrylate, tert-butylcyclohexyl acrylate, trimethylcyclohexyl methacrylate, trimethylcyclohexyl acrylate, dimethylcyclohexyl methacrylate, di methylcyclohexyl acrylate, adamantly methacrylate, adamantly acrylate, benzhydryl methacrylate, benzhydryl acrylate, benzyl acrylate, benzyl methacrylate, Chlorophenyl acrylate, chlorophenyl methacrylate, 2-naphthyl methacrylate, 2-naphthyl acrylate, 2-phenoxyethyl methacrylate, phenyl acrylate, phenyl methacrylate, 2-phenylethyl acrylate, 2-phenylethyl methacrylate, chlorophenyl acrylate, N,N-Diphenyl methacrylamide, N,N-diphenyl acrylamide, n-ethyl methacrylamide, n-ethyl acrylamide N-(tert-octyl) acrylamide, N-(tert-octyl) methacrylamide and 2-n-Butoxyethyl methacrylate.

Examples of monomers having the structure of Formula (III) include the following: methyl acrylate, methyl methacrylate, ethyl acrylate, ethyl methacrylate, n-Propyl acrylate, n-propyl methacrylate, i-propyl acrylate, i-propyl methacrylate, t-butyl acrylate, t-butyl methacrylate, n-butyl acrylate, n-butyl methacrylate, iso-butyl acrylate, iso-butyl methacrylate, sec-butyl acrylate, sec-butyl methacrylate, N-acryloylmorpholine, 2-methoxyethyl acrylate, 2-methoxyethyl methacrylate, ethyl acrylamide, N-iso-propyl acrylamide, N,N-Dimethyl acrylamide, N,N-Dimethyl methacrylamide, N,N-Diethyl acrylamide, N,N-diethyl methacrylamide, vinyl pyrrolidone, N-acryloylpiperazine, acrylonitrile, propylene, 1-butene, 1-pentene and 1-hexene.

The first and second copolymers may also be prepared from other monomers, for example ethylene, vinyl chloride and vinyl alcohol.

The first and second copolymer may be prepared from more than 80 mol % of monomers according to Formulas (I), (II) and (III). Typically the first and second copolymers are prepared only from monomers according to Formulas (I), (II) and (III).

The present invention may also relate to an antifouling coating composition comprising (a) an ingredient having marine biocidal properties, (b) a first copolymer, and (c) a second copolymer which is different to the first copolymer, wherein the first copolymer is obtainable from at least monomers of Formula (I), monomers of Formula (II) and optionally monomers of Formula (III); and the second copolymer is obtainable from at least monomers of Formula (I), monomers of Formula (III) and optionally monomers of Formula (II), wherein monomers of Formula (I) have the structure $CH_2=C(R^5)-Y-R^1Z^{(+)}R^{2(-)}$;

monomers of Formula (II) have the structure $CH_2=C(R^5)-Y-R^3$;

monomers of Formula (III) have the structure $CH_2=C(R^5)-Y-R^4$; wherein $R^5$ is H or $CH_3$, Z is a quaternary ammonium group or quaternary phosphonium group;

Y is $-C(O)-O-$, $-C(O)-NH-$, $-O-$;

$R^1$ is a divalent alkylene having 2 or 3 to 12 carbon atoms;

$R^2$ is an anionic residue of an acid counter having an aliphatic, aromatic, or alkaryl hydrocarbon group;

$R^3$ is a hydrocarbon group, optionally substituted with one or more heteroatoms selected from O, N, S, or a halogen group, wherein the total sum of carbon atoms in $R^3$ and $R^5$ in the same monomer is 5 or more; and $R^4$ is a hydrocarbon group, optionally substituted with one or more heteroatoms selected from O, N, S, or a halogen group, wherein the total sum of carbon atoms in $R^4$ and $R^5$ in the same monomer ranges from 1 to 4. The substituents, Z, Y, $R^1$, $R^2$, $R^3$ and $R^4$, are as further defined herein.

In another embodiment, provided herein is a method of providing a substrate with antifouling performance in an aqueous environment by (a) providing the antifouling coating composition as defined herein, (b) applying the coating composition to the substrate, (c) allowing the coating composition to cure to form a coating layer, (d) locating the substrate in coated substrate in the aqueous environment.

In another embodiment, provided herein is the use of the antifouling coating composition as described herein for protection of man-made structures immersed in water such as boat hulls, buoys, drilling platforms, oil production rigs, and pipes.

A process for preparing copolymers comprising salt groups which are quaternary ammonium groups or quaternary phosphonium groups bound to the side chain of the polymer, the quaternary groups being neutralised by an anionic residue of an acid counter-ion having an aliphatic, aromatic, or alkaryl hydrocarbon group, is well described in the prior art, for example in WO 2004/018533. One process in WO 2004/018533 described has the following steps:

(a) quaternisation of an amine- or phosphine-functional monomer. (quaternisation may be affected by reacting the monomer with a carbonic acid diester, such as dimethyl carbonate. Reaction conditions are described in EP-A-291 074. e.g. the reaction may be performed at a temperature of from 115° C. to 135° C. in the presence of an alcohol, preferably methanol, under an increased pressure of about 90 psi to 100 psi (6.1 105 Pa to 6.8 105 Pa)).

(b) replacement of the counter-ion of the quaternised ammonium or phosphonium monomer by a carboxylate group derived from an acid having an aliphatic, aromatic, or alkaryl hydrocarbon group comprising 6 or more carbon atoms, (c) polymerisation of the acid-capped quaternary ammonium/phosphonium monomer with one or more other monomers.

The coating composition may further comprise a rosin material. Rosin is not a very good film former, and it is known to add other film-forming resins to rosin-based anti-fouling paints. For example, the coating composition may comprise wood rosin or alternatively tall rosin or gum rosin. The main chemical constituent of rosin is abietic acid. The rosin can be any of the grades sold commercially, preferably that sold as WW (water white) rosin. The rosin material can alternatively be a rosin derivative, for example a maleinised or fumarised rosin, hydrogenated rosin, formylated rosin or polymerised rosin, or a rosin metal salt such as calcium, magnesium, copper or zinc rosinate.

The coating composition may optionally further comprise non-hydrolysing, film-forming polymers. The non-hydrolysing, film-forming polymers can be for example a polymer prepared by polymerizing one or more of the monomers according to Formula (II) or (III) above. The non-hydrolysing film-forming polymer can for example be a vinyl ether polymer, for example a poly(vinyl alkyl ether) or a copolymer of a vinyl alkyl ether with vinyl acetate or vinyl chloride, an acrylate ester polymer such as a homopolymer or copolymer of one or more alkyl acrylates or methacrylates which preferably contain 1 to 6 carbon atoms in the alkyl group and may contain a co-monomer such as acrylonitrile or styrene, or a vinyl acetate polymer such as polyvinyl acetate or a vinyl acetate vinyl chloride copolymer.

The coating composition typically comprises a liquid carrier to facilitate application by conventional methods such as spray, brush or roller. The liquid carrier may be, for example, an aromatic hydrocarbon such as xylene, toluene or trimethyl-benzene, an alcohol such as n-butanol, an ether alcohol such as butoxyethanol or methoxypropanol, an ester such as butyl acetate or isoamyl acetate, an ether-ester such as ethoxyethyl acetate or methoxypropyl acetate, a ketone such as methyl isobutyl ketone or methyl isoamyl ketone, an aliphatic hydrocarbon such as white spirit, water, or a mixture of two or more of these liquid carriers Typically, the coating composition will comprise liquid carrier will be in an amount ranging from about 5 to 60% by weight.

An anti-fouling paint according to the present invention, either with or without rosin, can include a non-polymeric plasticiser. Such a plasticiser can for example be present at up to 50% by weight based on the total binder polymer, most preferably at at least 10% and up to 35% by weight based on the binder polymer. Examples of such plasticisers are phthalate esters such as dibutyl phthalate, butyl benzyl phthalate or dioctyl phthalate, di-isononyl phthalate, phosphate triesters such as tricresyl or tris(isopropyl)phenyl phosphate, or chlorinated paraffins or sulphonamides such as N-substituted toluene sulphonamide.

Examples of non-biocidal pigments that can be added to the coating composition are slightly seawater-soluble non-biocides such as zinc oxide and barium sulphate and seawater-insoluble non-biocides such as fillers and colouring pigments, e.g., titanium dioxide, ferric oxide, phthalocyanine compounds, and azo pigments. Such highly insoluble pigments are preferably used at less than 60% by weight of the total pigment component of the paint, most preferably less than 40%.

Additives that can be added to the fouling control coating composition include, reinforcing agents, stabilisers, thixotropes or thickening agents, plasticisers, liquid carriers and non-biocidal pigments.

Examples of suitable reinforcing agents that can be added to the fouling control coating composition are fibres, e.g., carbide fibres, silicon-containing fibres, metal fibres, carbon fibres, sulphide fibres, phosphate fibres, polyamide fibres, aromatic polyhydrazide fibres, aromatic polyester fibres, cellulose fibres, rubber fibres, acrylic fibres, polyvinylchloride fibres, and polyethylene fibres. Preferably, the fibres have an average length of 25 to 2,000 microns and an average thickness of 1 to 50 microns with a ratio between the average length and the average thickness of at least 5. Examples of suitable stabiliser agents are moisture scavengers, zeolites, aliphatic or aromatic amines such as dehydroabietylamine, tetraethylorthosilicate, and triethyl orthoformate.

Examples of suitable thixotropes or thickening agents are silicas, bentones, and polyamide waxes.

The ingredient having marine biocidal properties usually is a biocide for aquatic organisms. This biocide can be mixed with the polymers using conventional paint-blending techniques. When the ingredient having marine biocidal properties is a pigment, it can be all or part of the pigment of the paint. The coating composition preferably has a pigment volume concentration of, for example, 30 to 60%.

The biocide of the present invention can be one or more of an inorganic, organometallic, metal-organic or organic biocide for marine or freshwater organisms. Examples of inorganic biocides include copper metal and copper salts such as copper oxide, copper thiocyanate, copper bronze, copper carbonate, copper chloride, copper nickel alloys, and silver salts such as silver chloride or nitrate; organometallic and metal-organic biocides include zinc pyrithione (the zinc salt of 2-pyridinethiol-1-oxide), copper pyrithione, bis (N-cyclohexyl-diazenium dioxy) copper, zinc ethylene-bis (dithiocarbamate) (i.e. zineb), zinc dimethyl dithiocarbamate (ziram), and manganese ethylene-bis(dithiocarbamate) complexed with zinc salt (i.e. mancozeb); and organic biocides include formaldehyde, dodecylguanidine monohydrochloride, thiabendazole, N-trihalomethyl thiophthalimides, trihalomethyl thiosulphamides, N-aryl maleimides such as N-(2,4,6-trichlorophenyl) maleimide, 3-(3,4-dichlorophenyl)-1,1-dimethylurea (diuron), 2,3,5,6-tetrachloro-4-(methylsulphonyl) pyridine, 2-methylthio-4-butylamino-6-cyclopopylamino-s-triazine, 3-benzo[b]thien-yl-5,6-dihydro-1,4,2-oxathiazine 4-oxide, 4,5-dichloro-2-(n-octyl)-3(2H)-isothiazolone, 2,4,5,6-tetrachloroisophthalonitrile, tolylfluanid, dichlofluanid, diiodomethyl-p-tosylsulphone, capsciacin, N-cyclopropyl-N'-(1,1-dimethylethyl)-6-(methylthio)-1,3,5-triazine-2,4-diamine, 3-iodo-2-propynylbutyl carbamate, medetomidine, 1,4-dithiaanthraquinone-2,3-dicarbonitrile (dithianon), boranes such as pyridine triphenylborane, a 2-trihalogenomethyl-3-halogeno-4-cyano pyrrole derivative substituted in position 5 and optionally in position 1, such as 2-(p-chlorophenyl)-3-cyano-4-bromo-5-trifluoromethyl pyrrole (tralopyril), and a furanone, such as 3-butyl-5-(dibromomethylidene)-2(5H)-furanone, and mixtures thereof, macrocyclic lactones such as avermectins, for example avermectin B1, ivermectin, doramectin, abamectin, amamectin and selamectin, and quaternary ammonium salts such as didecyldimethylammonium chloride and an alkyldimethylbenzylammonium chloride.

In the context of the present invention, an inorganic biocide is a biocide whose chemical structure comprises a metal atom and which is free of carbon atoms; an organometallic biocide is a biocide whose chemical structure comprises a metal atom, a carbon atom, and a metal-carbon bond; a metal-organic biocide is a biocide whose chemical structure comprises a metal atom, a carbon atom, and which is free of metal-carbon bonds; and an organic biocide is biocide whose chemical structure comprises a carbon atom and which is free of metal atoms.

Furthermore, the biocide may optionally be wholly or partially encapsulated, adsorbed or supported or bound. Certain biocides are difficult or hazardous to handle and are advantageously used in an encapsulated or absorbed or supported or bound form. Additionally, encapsulation, absorption or support or binding of the biocide can provide a secondary mechanism for controlling biocide leaching rate from the coating system in order to achieve an even more gradual release and long lasting effect.

The method of encapsulation, adsorption or support or binding of the biocide is not particularly limiting for the present invention. Examples of ways in which an encapsulated biocide may be prepared for use in the present invention include mono and dual walled amino-formaldehyde or hydrolysed polyvinyl acetate-phenolic resin capsules or microcapsules as described in EP1791424.

Examples of ways in which an absorbed or supported or bound biocide may be prepared include the use of host-guest complexes such as clathrates as described in EP0709358, phenolic resins as described in EP0880892, carbon-based adsorbents such as those described in EP1142477, or inorganic microporous carriers such as the amorphous silicas, amorphous aluminas, pseudoboehmites or zeolites described in EP1115282.

The invention will be elucidated with reference to the following examples. These are intended to illustrate the invention but are not to be construed as limiting in any manner the scope thereof.

EXAMPLES

Preparation of Monomer with Functionality A1 or A2.

Dimethylaminopropyl methacrylamide (192.1 g), dimethylcarbonate (179.6 g) and methanol (208 g), were placed in a stainless steel, high pressure reaction vessel. The sealed vessel was heated to 125° C. for 4 hours. The cooled solution was filtered and dried in vacuo after addition of methanol (150 g).

The resulting viscous amber liquid, trimethylaminopropyl methacrylamide (244.7 g) was diluted with xylene (200 g) and placed in a 2 L round bottom flask. To this was added at room temperature with stirring over 30 minutes a solution of dodecylbenzenesulphonic acid (244.7 g) in xylene (200 g), and stirring was continued overnight to provide a solution of 3-(methacrylamidopropyl) trimethylammonium dodecylbenzenesulfonate (MATMA-DBSA) in xylene.

Example 1A

A solution of monomers consisting of MATMA-DBSA (250.0 g), iBoMA (435.2 g) and 2,2'-Azobis-2-methylbutyronitrile (AMBN) initiator (4.7 g) AMBN in xylene (23.5 g) and butanol (23.5 g) was added at constant rate over 5 hours with mechanical stirring to a polymerisation reaction vessel containing xylene (202.1 g) and butanol (202.1 g) held at 85 degrees C. Once the addition was complete the temperature was increased to 95° C., and a solution of AMBN (2.4 g) in xylene (12 g) and butanol (12 g) was added and the reaction was held at this temperature for 2 hours. The reaction mixture was then cooled to provide a solution of the MATMA-DBSA:iBoMA copolymer of Example 1A, which was placed in a storage vessel.

The molar ratio of monomers used to prepare this polymer was 20 mol % of salt monomer: 80 mol % of isobornyl methacrylate. Each monomer molecule incorporated into the copolymer molecule provided one pendant side chain.

Example 1B

A solution of monomers consisting of MATMA-DBSA (250.0 g), BMA (278.4 g) and AMBN initiator (4.7 g) in xylene (23.5 g) and butanol (23.5 g) was added at constant rate over 5 hours with mechanical stirring to a polymerisation reaction vessel containing xylene (123.7 g) and butanol (123.7 g) held at 85 degrees C. Once the addition was complete the temperature was increased to 95° C., a solution of AMBN (2.4 g) in xylene (12 g) and butanol (12 g) was added and the reaction was held at this temperature for 2 hours. The reaction mixture was then cooled to provide a solution of the MATMA-DBSA:BMA copolymer of Example 1B, which was placed in a storage vessel.

The molar ratio of monomers used to prepare this polymer was 20 mol % of salt monomer: 80 mol % of butyl methacrylate. Each monomer molecule incorporated into the copolymer molecule provided one pendant side chain.

Example 1C

A solution of monomers consisting of MATMA-DBSA (250.0 g), iBoMA (217.6 g), BMA (139.2 g) and AMBN initiator (4.7 g) in xylene (23.5 g) and butanol (23.5 g) was added at constant rate over 5 hours with mechanical stirring to a polymerisation reaction vessel containing xylene (162.9 g) and butanol (162.9 g) held at 85 degrees C. Once the addition was complete the temperature was increased to 95° C., and a solution of AMBN (2.4 g) in xylene (12 g) and butanol (12 g) was added and the reaction was held at this temperature for 2 hours. The reaction mixture was then cooled to provide a solution of the MATMA-DBSA:iBoMA:BMA copolymer of Example 1C, which was placed in a storage vessel.

The molar ratio of monomers used to prepare this polymer was 20 mol % of salt monomer: 40 mol % of butyl methacrylate: 40 mol % of isobornyl methacrylate. Each monomer molecule that incorporated into the copolymer molecule provided one pendant side chain.

Example Paint 2a

Example 2a an antifouling coating composition according to the invention comprising two copolymers. The first copolymer is the copolymer of Example 1A. The second copolymer is the copolymer of Example 1B.

The antifouling coating composition was prepared by mixing the materials listed in Table 1 in the stated amounts by weight using a high speed disperser to form a fouling-control paint.

TABLE 1

| Name | Description | Dry Film volume | Wt % |
| --- | --- | --- | --- |
| Polymer solution of example 1A | Binder | 20 | 11.5 |
| Polymer solution of example 1B | Binder | 20 | 11.5 |
| Chlorinated paraffin (Cereclor 48, Ineos Chlor) | Plasticiser | 13.5 | 5 |

TABLE 1-continued

| Name | Description | Dry Film volume | Wt % |
| --- | --- | --- | --- |
| Copper pyrithione (Lonza) | Biocide | 8 | 4 |
| Iron Oxide (Bayferrox 130BM) | Pigment | 5 | 7 |
| Zinc Oxide (Larvik) | Pigment | 8 | 12 |
| Copper Oxide (American Chemet) | Biocide | 24 | 40 |
| Polyamide wax (Disparlon A600-020X, Kusomoto Chemicals)) | Thixotrope | 1.5 | 2 |
| Xylene | Solvent | 0 | 7 |

Example Paint 2b

Example Paint 2b is an antifouling coating composition which is provided as a comparative example. It comprises just one copolymer: the copolymer of Example 1C. The monomers making up the copolymer in Example Paint 2b are exactly the same, and in the same relative proportions, as the monomers making up the two copolymers in Example Paint 2a.

The antifouling coating composition was prepared by mixing the materials listed in Table 2 in the stated amounts by weight using a high speed disperser.

TABLE 2

| Name | Description | Dry Film volume | Wt % |
| --- | --- | --- | --- |
| Polymer solution of example 1C | Binder | 40 | 23 |
| Chlorinated paraffin (Cereclor 48, Ineos Chlor) | Plasticiser | 13.5 | 5 |
| Copper pyrithione (Lonza) | Biocide | 8 | 4 |
| Iron Oxide (Bayferrox 130BM) | Pigment | 5 | 7 |
| Zinc Oxide (Larvik) | Pigment | 8 | 12 |
| Copper Oxide (American Chemet) | Biocide | 24 | 40 |
| Polyamide wax (Disparlon A600-020X, Kusomoto Chemicals)) | Thixotrope | 1.5 | 2 |
| Xylene | Solvent | 0 | 7 |

Antifouling Testing

As a test of antifouling performance the paints of Examples 2a-2b were each applied to plywood boards which had been pre-painted with a commercial anti-corrosive primer and the boards were immersed in the sea at two locations globally. The paint films were periodically assessed for settlement of marine fouling organisms and the results are shown in Table 3 below.

In all results quoted below, 0%=Totally clean, 100%=Totally fouled.

TABLE 3

| | Total % coverage of fouling | |
| --- | --- | --- |
| Location | Paint Example 2a | Comparative Paint Example 2b |
| Singapore (12 months immersion) | 14% | 63% |
| Hartlepool (12 months immersion) | 38% | 91% |

The test results show that a coating composition comprising the two copolymers according to the invention (Paint 2a)

had substantially better antifouling performance compared to a coating composition comprising just one copolymer (Paint 2b).

This is surprising because, in both paints, the monomers making up the polymer(s) were exactly the same, and in exactly the same proportions (20 mol % salt: 40 mol % butyl methacrylate: 40 mol % isobornyl methacrylate). The only difference between the paints was how the monomers were distributed between the copolymers.

In Paint 2a, the first polymer was made up from half the salt monomers and all the isobornyl methacrylate monomers, and the second polymer was made up from half the salt monomers and all the butyl methacrylate monomers.
The molar ratio (expressed as mol % of A1:mol % of B1:mol % of C1) in the first copolymer was 20:80:0.
The molar ratio (expressed as mol % of A2:mol % of B2:mol % of C2) in the second copolymer was 20:0:80.

In Paint 2b, there was only one copolymer which was made up from 20 mol % of salt monomer: 40 mol % of butyl methacrylate: 40 mol % of isobornyl methacrylate.

The invention claimed is:

1. An antifouling coating composition comprising
(a) an ingredient having marine biocidal properties,
(b) a first copolymer comprising pendant to the polymer backbone, side chains A1, side chains B1 and optionally side chains C1, and
(c) a second copolymer comprising pendant to the polymer backbone, side chains A2, side chains C2, and optionally side chains B2,
wherein
side chains A1 and A2 are same or different and comprise a non-metal salt group, and have the structure:
—$(Y)_n$—$R^1$—$Z(^+)$ $R^{2(-)}$
wherein
Y is —C(O)—O—, —C(O)—NH—, —O—;
n is 0 or 1;
$R^1$ is a divalent alkylene having 2 or 3 to 12 carbon atoms,
Z is a quaternary ammonium group or quaternary phosphonium group and
$R^2$ is an anionic residue of an acid counter-ion having an aliphatic, aromatic, or alkaryl hydrocarbon group;
side chains B1 and B2 are same or different and have the structure —$(Y)_n$—$R^3$;
side chains C1 and C2 are same or different and have the structure —$(Y)_n$—$R^4$;
Y is —C(O)—O—, —C(O)—N($R^6$)—, or —O—;
n is 0 or 1;
$R^6$ is H, a monovalent hydrocarbon group, or a bond to $R^3$ or $R^4$;
$R^3$ is a hydrocarbon group, optionally substituted with one or more heteroatoms selected from O, N, S, or a halogen group, wherein the total sum of carbon atoms in $R^3$ and $R^6$ in each of side chains B1 and B2 is 5 or more; and
$R^4$ is a hydrocarbon group, optionally substituted with one or more heteroatoms selected from O, N, S, or a halogen group wherein the total sum of carbon atoms in $R^4$ and $R^6$ in each of side chains C1 and C2 ranges from 1 to 4;

and wherein the molar ratio of $$\frac{\text{side chains } B1}{\text{side chains } B1 + \text{side chains } C1}$$

in the first copolymer is great than or equal to 0.50, and the molar ratio of $$\frac{\text{side chains } B2}{\text{side chains } B2 + \text{side chains } C2}$$

in the second copolymer is less than 0.50.

2. The antifouling coating composition of claim 1 wherein $R^3$ is a linear, branched or cyclic alkyl or aryl group, optionally substituted with one or more heteroatoms selected from O, N, S, or a halogen group, wherein the total sum of carbon atoms in $R^3$ and $R^6$ in each of side chains B1 and B2 is 5 or more; and
$R^4$ is a linear, branched or cyclic alkyl group, optionally substituted with one or more heteroatoms selected from O, N, S, or a halogen group wherein the total sum of carbon atoms in $R^4$ and $R^6$ in each of side chains C1 and C2 ranges from 1 to 4.

3. The antifouling coating composition according to claim 1 wherein the anionic residue of the acid counter-ion has an aliphatic, aromatic, or alkaryl hydrocarbon group comprising 6 or more carbon atoms.

4. The antifouling coating composition according to claim 1 wherein the counter-ions comprise 6 to 50 carbon atoms.

5. The antifouling coating composition of claim 1 wherein the first copolymer and the second copolymer are poly(meth)acrylate or poly(meth)acrylamide copolymers.

6. The antifouling coating composition of claim 1 wherein the molar ratio of $$\frac{\text{side chains } B1}{\text{side chains } B1 + \text{side chains } C1}$$

is greater than or equal to 0.60, and the molar ratio of $$\frac{\text{side chains } B2}{\text{side chains } B2 + \text{side chains } C2}$$

is less than 0.40.

7. The antifouling coating composition according to claim 1 wherein the mol % of side chains A1: mol % of side chains B1: mol % of side chains C1 in the first copolymer is 5-50: 50-95: 0-45, and
the mol % of side chains A2: mol % of side chains B2: mol % of side chains C2 in the second copolymer is 5-50: 0-45: 50-95,
wherein mol % in the first copolymer is based on the total sum of side chains A1+B1+C1 and mol % in the second copolymer in based on the total sum of side chains A2+B2+C2.

8. The antifouling coating composition of claim 1 wherein $R^3$ is a linear, branched or cyclic alkyl or aryl group, optionally substituted with one or more heteroatoms selected from O, N, S, or a halogen group, wherein the total sum of carbon atoms in $R^3$ and $R^6$ in each of side chains B1 and B2 ranges between 5 and 40.

9. A method of providing a substrate with antifouling performance in an aqueous environment by
   (a) providing the antifouling coating composition as defined in claim 1,
   (b) applying the coating composition to the substrate,
   (c) allowing the coating composition to cure to form a coating layer, and
   (d) locating the coated substrate in the aqueous environment.

10. The antifouling coating composition of claim 1 wherein $R^3$ is a linear, branched or cyclic alkyl or aryl group, optionally substituted with one or more heteroatoms selected from O, N, S, or a halogen group, wherein the total sum of carbon atoms in $R^3$ and $R^6$ in each of side chains B1 and B2 ranges between 5 and 25.

11. The method of claim 9, wherein the substrate is the surface of a boat hull, buoy, drilling platform, oil production rig, or a pipe.

\* \* \* \* \*